(12) United States Patent
Baur et al.

(10) Patent No.: US 10,207,451 B2
(45) Date of Patent: Feb. 19, 2019

(54) THERMOFORM PACKAGING MACHINE WITH MOVABLE MOLD INSERT

(71) Applicant: Multivac Sepp Haggenmüller GmbH & Co. KG, Wolfertschwenden (DE)

(72) Inventors: Hubert Baur, Lauben (DE); Florian Ferk, Bad Grönenbach (DE)

(73) Assignee: Multivac Sepp Haggenmueller SE & CO. KG, Wolfertschwenden (DE)

( * ) Notice: Subject to any disclaimer, the term of this patent is extended or adjusted under 35 U.S.C. 154(b) by 485 days.

(21) Appl. No.: 14/823,953

(22) Filed: Aug. 11, 2015

(65) Prior Publication Data
US 2016/0046063 A1 Feb. 18, 2016

(30) Foreign Application Priority Data
Aug. 13, 2014 (EP) .................... 14180776

(51) Int. Cl.
*B29C 51/26* (2006.01)
*B29C 51/18* (2006.01)
*B65B 47/10* (2006.01)
*B65B 9/04* (2006.01)
*B65B 31/02* (2006.01)
*B29L 31/00* (2006.01)

(52) U.S. Cl.
CPC ............ *B29C 51/261* (2013.01); *B29C 51/18* (2013.01); *B65B 9/04* (2013.01); *B65B 31/021* (2013.01); *B65B 31/028* (2013.01); *B65B 47/10* (2013.01); *B29L 2031/712* (2013.01)

(58) Field of Classification Search
CPC ....... B65B 9/04; B65B 31/021; B65B 31/028; B65B 47/10; B29C 51/34; B29C 51/18

USPC .......................................................... 264/318
See application file for complete search history.

(56) References Cited

U.S. PATENT DOCUMENTS

| 5,014,500 | A | | 5/1991 | Robache | |
|---|---|---|---|---|---|
| 5,307,610 | A | * | 5/1994 | Schneider | B29C 51/34 425/384 |
| 6,254,375 | B1 | * | 7/2001 | Thomas | B29C 51/20 425/403 |
| 6,440,354 | B1 | * | 8/2002 | Takai | B29C 51/343 264/550 |
| 2012/0289388 | A1 | * | 11/2012 | Ehrmann | B29C 33/30 483/1 |
| 2013/0068370 | A1 | * | 3/2013 | Harding | B29C 51/34 156/69 |

FOREIGN PATENT DOCUMENTS

| EP | 0186729 A1 | 7/1986 |
|---|---|---|
| EP | 0962386 A1 | 12/1999 |
| EP | 2570351 A1 | 3/2013 |

* cited by examiner

*Primary Examiner* — Matthew J Daniels
*Assistant Examiner* — Hana C Page
(74) *Attorney, Agent, or Firm* — Husch Blackwell LLP

(57) ABSTRACT

The present invention relates to a thermoform packaging machine with a forming station. The forming station can include a forming tool lower part with at least one mold insert that is movable relative to the forming tool lower part. The present invention also relates to a method of forming a film including the step of moving the mold insert, relative to the forming tool lower part and the formed film, to a removal position while the film is clamped between the forming tool upper part and the forming tool lower part.

12 Claims, 6 Drawing Sheets

THERMOFORM PACKAGING MACHINE WITH MOVABLE MOLD INSERT

CROSS-REFERENCE TO RELATED APPLICATIONS

This Application claims priority to European Patent Application Number 14180776.8 filed Aug. 13, 2014, to Hubert Baur et al., currently pending, the entire disclosure of which is incorporated herein by reference.

FIELD OF THE INVENTION

The present invention relates to a thermoform packaging machine and to a method of operating a thermoform packaging machine.

BACKGROUND OF THE INVENTION

EP 2 570 351 A1 discloses a thermoform packaging machine with a forming station for forming packages with an undercut. Thermoform packaging machines that form packages with a very small undercut use a clamp chain provided on both sides of the film for transporting the film and holding the formed film when the forming tool lower part is being opened. The tensile forces due to the undercut acting on the formed film during opening of the forming tool lower part can be taken up by the clamp chains only to a limited extent and the film will be pulled out of the clamp chains when the tensile forces are too large.

SUMMARY OF THE INVENTION

It is the object of the present invention to provide an improved forming station for a thermoform packaging plant and a method of operating such a forming station for forming undercuts into a film.

The thermoform packaging machine according to one embodiment of the present invention can comprise a forming tool lower part and at least one mold insert provided in the interior of the forming tool lower part. The mold insert can comprise a mold bottom and a circumferentially extending sidewall, and the mold insert can be movable relative to the forming tool lower part surrounding the mold insert. The mold insert can have on at least one sidewall thereof an undercut for thermoforming a corresponding or congruent undercut in a trough to be formed in the mold insert. This can enable the packaging machine to form a stand-up package, such as for example, a stand-up package having a shape of the type known from EP 2 570 351 A1.

The one or more mold inserts can be removed from the film once it has been formed into a trough shape and when the film itself has cooled down. The mold inserts can be moved downward into the forming tool lower part without the necessity of bearing, by means of lateral clamp chains, the tensile forces created by undercuts of the troughs in the mold inserts and acting on the film, since the film can still be clamped between a forming tool upper part and the forming tool lower part. The mold insert can be formed in one piece.

The forming tool lower part can include a lift drive for the mold insert, so that the mold insert can be moved relative to the forming tool lower part and, consequently, also within the forming tool lower part between a forming position and a removal position.

According to one embodiment, a common lift drive is provided for all mold inserts, so as to synchronize the movement of the mold inserts and provide a cost-efficient structural design. The lift drive can comprise a pneumatic cylinder or a servomotor, or other suitable device, so as to allow for fast and/or precise positioning or movements of the mold insert. Preferably, the mold insert has a height in the interior thereof and is movable relative to the forming tool lower part to an extent corresponding to at least this height. The undercut can have a depth of at least 2 mm, relative to the sidewall areas exhibiting no undercut, according to one embodiment of the present invention.

A method according to one embodiment of the present invention used for forming a film in a thermoform packaging machine can comprise the following steps:

closing a forming station and clamping the film between a forming tool upper part and a fowling tool lower part;

thermoforming the film into a mold insert accommodated in the interior of the forming tool lower part, so as to form a packaging trough while bringing the film simultaneously or subsequently into contact with at least one undercut defined in the mold insert, with said mold insert occupying a forming position;

after thermoforming of the film, moving the mold insert relative to the forming tool lower part and relative to the formed film to a removal position while the film remains clamped between the forming tool upper part and the forming tool lower part;

subsequently, opening the forming station so that the thermoformed trough can be removed or transported further.

The method can be characterized in that the mold insert can be moved relative to the forming tool lower part and the formed film to a removal position while the film can be clamped between the forming tool upper part and the forming tool lower part.

The mold insert can have a clear height in the interior thereof and can be moved relative to the tool lower part to an extent corresponding to at least this height, so as to move the mold insert in its entirety away from the range of movement of the trough formed in the film and so as to be able to further transport, after opening of the forming station, the trough by means of clamp chains provided on both sides for a subsequent work cycle.

According to one embodiment of the present invention, a plurality of mold inserts are moved relative to the forming tool between a forming position and the removal position by means of a common lift drive.

The film can also be clamped between at least one forming plate web of the forming tool, lower part and the forming tool upper part, so that in the case of a plurality of mold inserts and troughs to be formed, the film will be clamped around each trough.

According to a one embodiment, the mold insert can be prevented from moving to the forming position in the closed condition of the forming station when a trough that has already been formed in the film is located between the forming tool upper part and the forming tool lower part. This can prevent a collision between or a compression of formed troughs. The prevention of movement of the mold insert can be accomplished via a control unit of the thermoform packaging machine, since the control unit can contain the information relating to which troughs have already been formed and are present in the open forming station, between either the forming tool lower part, the forming tool upper part, or both.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Like components are identified by like reference numerals throughout the figures.

DETAILED DESCRIPTION OF THE INVENTION

Figure 1:
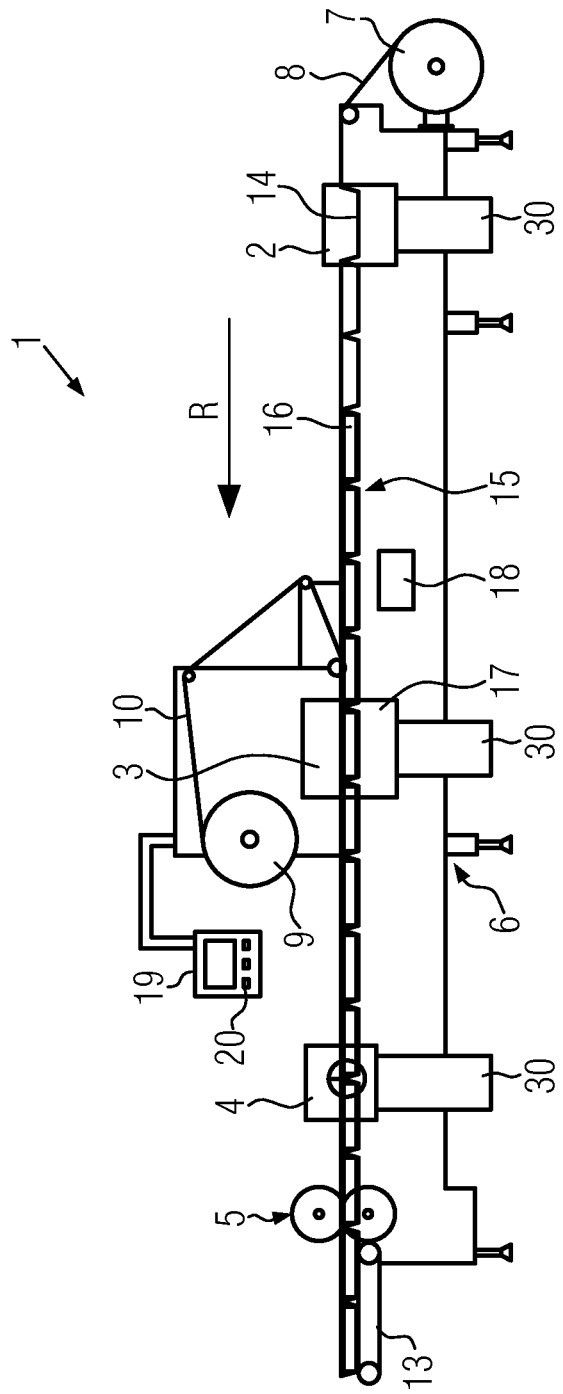
FIG. 1 is a schematic side view of a thermoform packaging machine with a forming station and operating in a production direction in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 2:
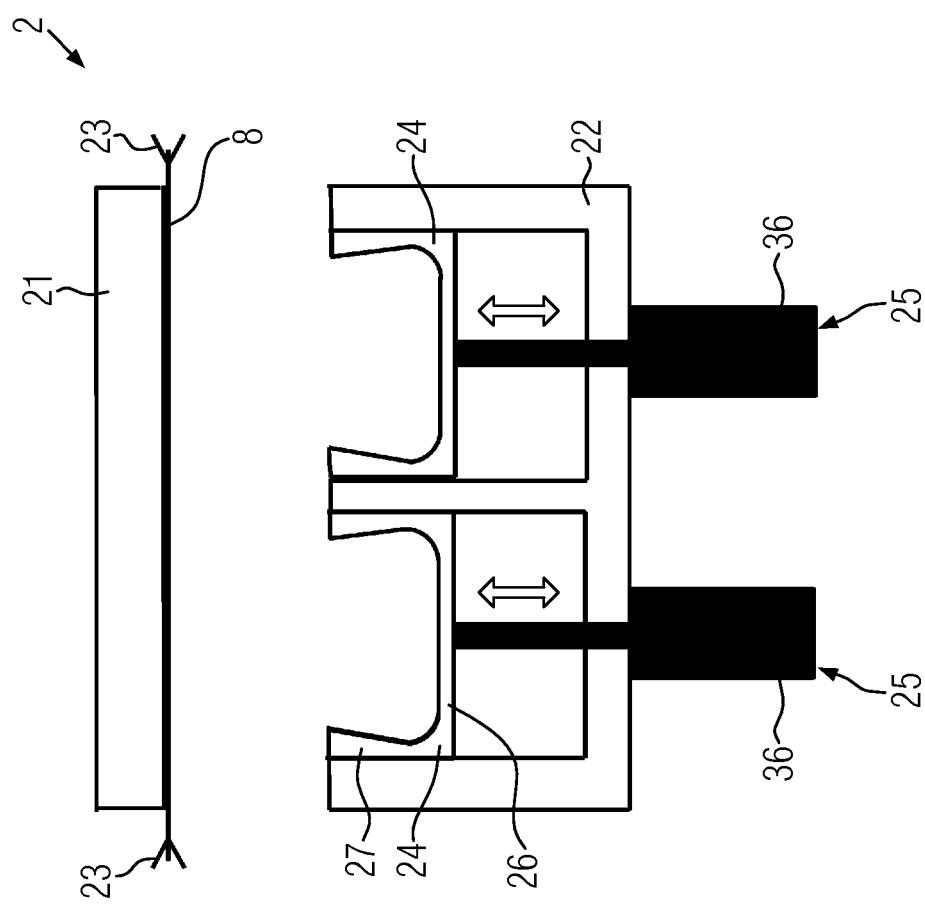
FIG. 2 is a schematic front view of a forming station, illustrating the forming station in an open position in accordance with one embodiment of the present invention.

FIG. 1 shows a schematic view of a thermoform packaging machine 1 according to one embodiment of the present invention. The thermoform packaging machine 1 can comprise a forming station 2, a sealing station 3, a transverse cutting device 4 and a longitudinal cutting device 5, all of which can be arranged in a production direction R on a machine frame 6 as illustrated in FIG. 1. The thermoform packaging machine 1 can further comprise a supply roll 7 provided on the machine frame 6 on the input side of the machine 1, from which a film 8 can be unwound. In the area of the sealing station 3, a material storage unit 9 can be provided, from which a cover film 10 can be unwound as best illustrated in FIG. 1. On the output side, the thermoform packaging machine 1 can include a discharge device 13 in the form of a conveyor belt, with which finished, singulated packages can be transported away. Furthermore, the thermoform packaging machine 1 can comprise a feeding device (not shown) for gripping the film 8 and advancing it in the production direction R during each main work cycle. The feeding device (not shown) can grip and advance the film 8 through transport chains 23 arranged on one or both sides, as best shown in FIG. 2.

In the embodiment shown in the figures, the forming station 2 is configured as a thermoforming station, in which troughs 14 can be formed in the film 8 by thermoforming. The forming station 2 can be configured such that, in the direction perpendicular to the production direction R, several troughs can be formed side by side. The forming station 2 can include a lifting unit 30 for moving a forming tool lower part or a tool 22 (illustrated in FIG. 2) upwards into contact with a forming tool upper part 21 to a working position for the forming process. Downstream of the forming station 2, when seen in the production direction R, an infeed line 15 can be provided, along which the troughs 14 formed in the film 8 can be filled with products 16.

The sealing station 3 can include a lifting unit 30 and a closable chamber 17, in which the atmosphere in the troughs 14 can be substituted, prior to sealing, by an exchange gas or by a gas mixture, such as through evacuation or gas flushing.

The transverse cutting device 4, which can also include a lifting unit 30, can be configured as a punch separating the film 8 and the cover film 10 in a direction transversely to the production direction R between adjacent troughs 14. When separating the film 8, the transverse cutting device 4 does not need to cut across the whole width of the film 8 and can leave at least one uncut portion, such as an edge area. This can allow controlled further transport by the feeding device.

The longitudinal cutting device 5 can be configured as a blade arrangement by means of which the film 8 and the cover film 10 are cut between adjacent troughs 14 and at the lateral edge of the film 8, so that, downstream of the longitudinal cutting device 5, singulated packages are formed, according to one embodiment of the present invention.

The thermoform packaging machine 1 can also include a controller 18 for controlling and monitoring the processes taking place in the thermoform packaging machine 1. A display device 19 with operating controls 20 can serve to make the sequences of process steps in the thermoform packaging machine 1 visible to an operator and allow the operator to control the operation of the machine 1.

The general mode of operation of the packaging machine 1, according to one embodiment of the present invention, will now be described below. The following is intended only to generally describe the operation of one particular embodiment of the packaging machine 1 disclosed herein and is not intended to limit the scope of the present invention in any way. Several alternative modes of operation are suitable depending on the particular configuration or circumstances.

The film 8 can be unwound from the supply roll 7 and conveyed into the forming station 2 by the feeding device (not shown). In the forming station 2, troughs 14 can be formed in the film 8 by thermoforming. Together with the material of the film 8 surrounding them, the troughs 14 can then be advanced, in a main work cycle, to the infeed line 15 where they can be filled with products 16.

The filled troughs 14 can then, together with the area of the film 8 surrounding them, be advanced by the feeding device into the sealing station 3. After having been sealed onto the film 8, the cover film 10 can be advanced through the feed motion of the film 8 In the course of this process, the cover film 10 can be unwound from the material storage unit 9. By sealing the cover film 10 onto the troughs 14, closed packages can be obtained, which can be singulated in the subsequent cutting stations 4 and 5 and removed from the thermoform packaging machine 1 by means of the discharge device 13.

FIG. 2 shows a sectional view of the forming station 2 at an open position in the production direction R, according to one embodiment of the present invention. The forming station 2 can comprise a forming tool upper part 21 and a forming tool lower part 22. The film 8 can be held and transported by a feeding device that can include one or more laterally provided clamp chains 23. In the embodiment illustrated in FIG. 2, clamp chains 23 are provided on each side of the film 8. In the interior of the forming tool lower part 22, one or more mold inserts 24 can be provided. The mold inserts 24 can be separate from the forming tool upper and lower parts 21 and 22 and can be movable relative to the forming tool lower part 22 by means of one or more lift drives 25. As shown in FIG. 2, forming station 2 can include two adjacent mold inserts 24 each controlled by a lift drive 25, according to one embodiment of the present invention. The lift drives 25 can be configured as pneumatic cylinders 36 or as motor drives, such as servomotors 36. Each mold insert 24 can comprise a mold bottom 26 and a circumferentially extending or perimeter sidewall 27. The mold insert 24 may be formed integrally or such that the mold bottom 26 and a plurality of sidewalls are combined so as to form a unit.

Figure 3:
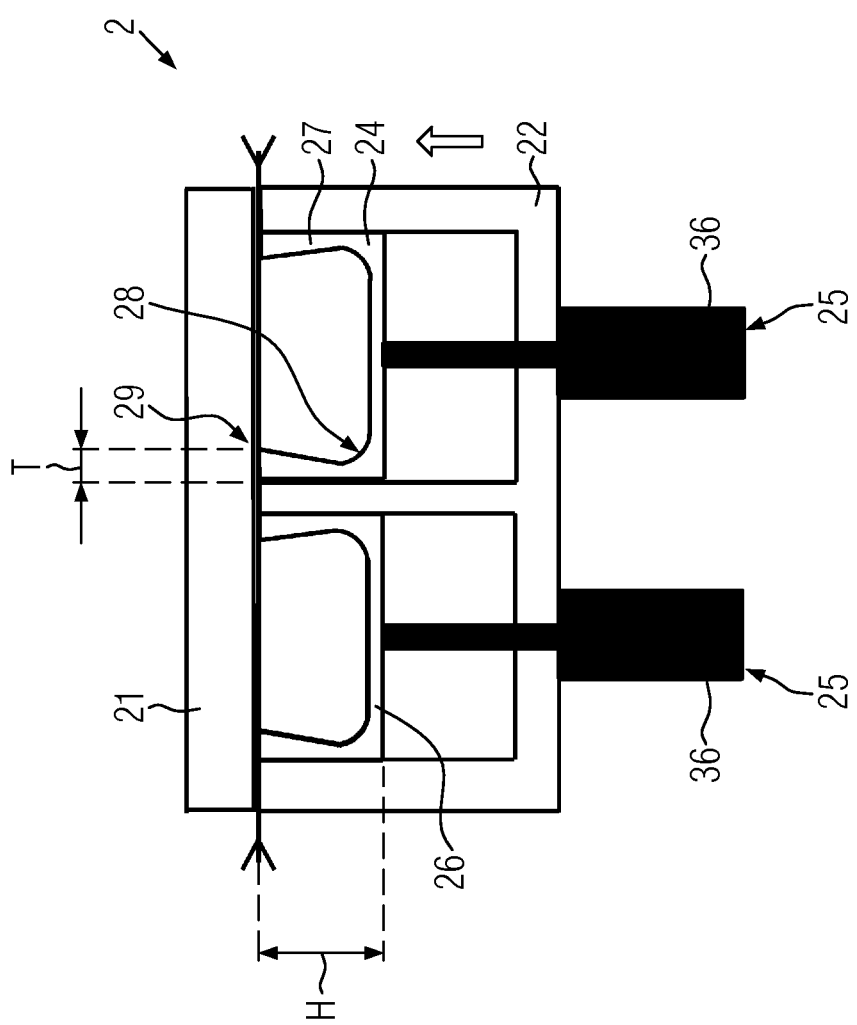
FIG. 3 is a schematic front view of the forming station of FIG. 2, illustrating the forming station in a closed position in accordance with one embodiment of the present invention.

FIG. 3 shows the forming station 2 at a closed position, according to one embodiment of the present invention. The forming station 2 can move from the open position to the closed position by lifting the forming tool lower part 22 in the direction of the arrow (shown in FIG. 3) by means of the lifting unit 30 up to and into contact with the forming tool upper part 21. In the course of this movement, the film 8 can be clamped in position between the fanning tool lower part 22 and the forming tool upper part 21. At this position, the film 8 can be heated via the forming tool upper part 21 and formed into the mold inserts 24. This can be accomplished through thermoforming, by means of compressed air from above and/or, optionally, by a vacuum in the forming tool lower part 22. As shown in FIG. 3, each mold insert 24 can have an undercut 28 defined in at least one sidewall 27 thereof. The undercut 28 can comprise a horizontally oriented indentation T relative to an inner circumferentially extending or perimeter upper edge 29. The mold insert 24 can also have a clear height H in the interior thereof. The boundaries of the clear height H can be defined by the upper side of the mold bottom 26 and by the upper edge 29 of the sidewall 27, as best shown in FIG. 3.

Figure 4:
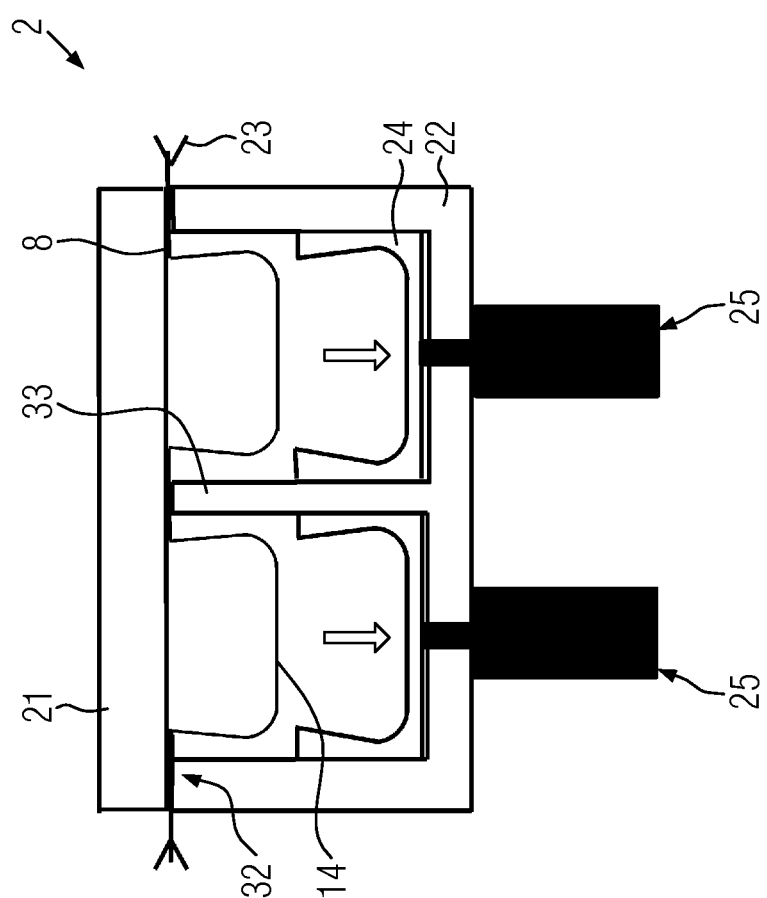
FIG. 4 is a schematic front view of the forming station of FIG. 2, illustrating the forming station in a closed position with lowered mold inserts in accordance with one embodiment of the present invention.

After the forming process, the mold inserts 24 can be moved downward in the direction of the arrows by means of the lift drives 25 away from the forming tool upper part 21. During this movement, the mold inserts 24 can also move relative to the forming tool lower part 22 and the formed troughs 14, which can remain stationary, as shown in FIG. 4. In the course of this movement, tensile forces created by the undercuts 28 and acting on the film 8 occur. The forces need not be taken up by the clamp chains 23, but rather can be taken up through clamping of the film 8 on the outer walls 32 of the of the forming tool lower part 22 and the forming tool upper part 21 as well as between a web 33 of the forming tool lower part 22 and the forming tool upper part 21, as best shown in FIG. 4.

Figure 5:
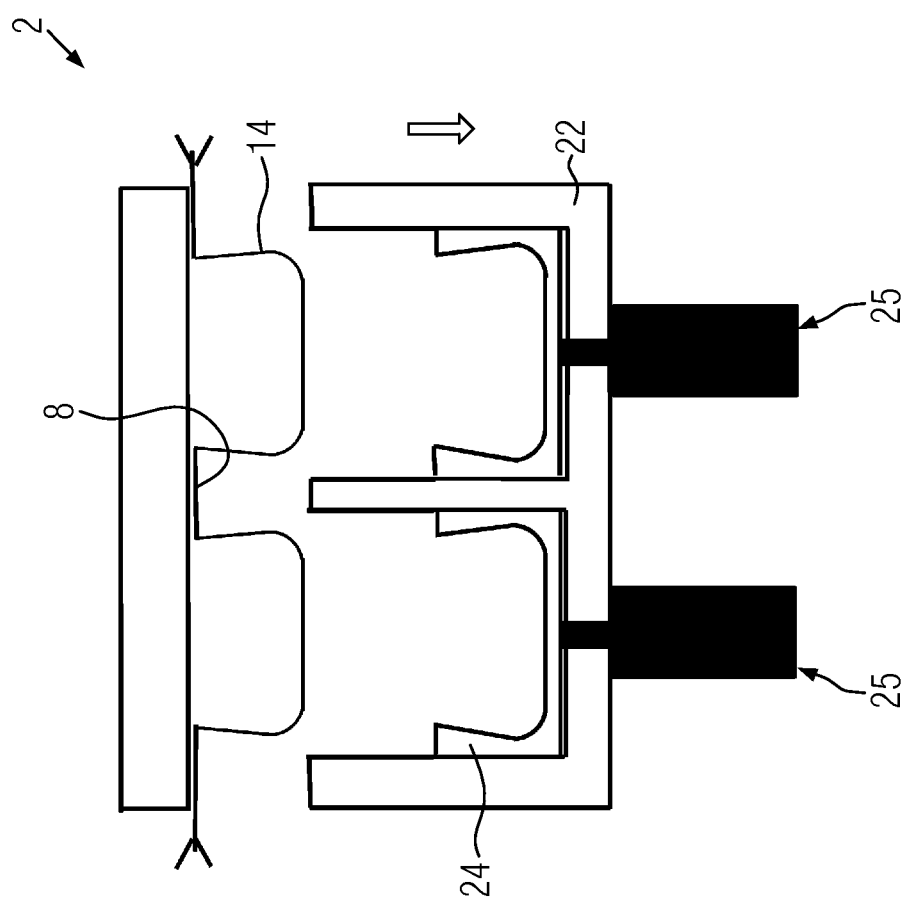
FIG. 5 is a schematic front view of the forming station of FIG. 2, illustrating the forming station in an open position with lowered mold inserts in accordance with one embodiment of the present invention.

After the formed troughs 14 have been removed from the mold inserts 24, as shown in FIGS. 4 and 5, the forming tool lower part 22, with the mold inserts 24 in the interior thereof, can be moved downwards in the direction of the arrow, so as to release the film 8 for further transport for the next work cycle. This movement is best illustrated in FIG. 5. Subsequently, the mold inserts 24 can be raised relative to the forming tool lower part 22 to the forming position, as shown in FIG. 2, or said relative movement may take place only during or after the closing movement with which the forming tool lower part 22 moves into contact with the forming tool upper part 21.

Figure 6:
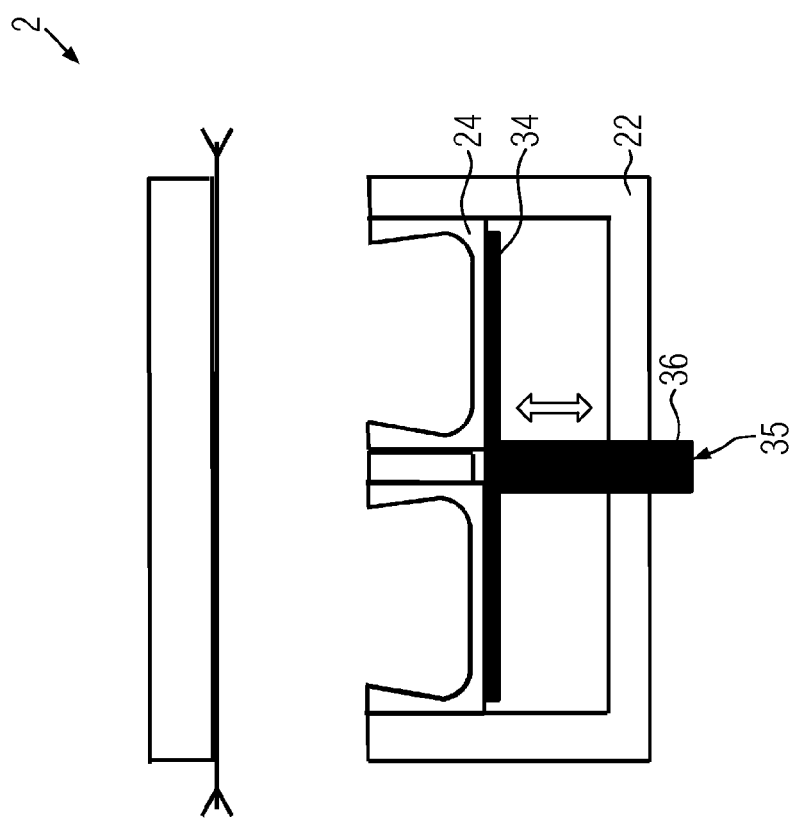
FIG. 6 is a schematic front view of a forming station in an open position for use in the thermoform packaging machine shown in FIG. 1 in accordance with an alternative embodiment of the present invention.

FIG. 6 shows an alternative embodiment of the forming tool lower part 22. In this embodiment, the mold inserts 24 are arranged on a common lifting plate 34 and only a single lift drive 35 is provided for moving a plurality of or all of the mold inserts 24 relative to the forming tool lower part 22.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A thermoform packaging machine comprising:
a packaging film conveyed through the thermoform packaging machine in a transport plane;
a forming station for forming troughs in the packaging film, said forming station having a forming tool upper part and a forming tool lower part, wherein the forming tool upper part and the forming tool lower part are disposed for relative movement between an open position and a closed position, wherein said forming tool upper part and said forming tool lower part clamp said packaging film in said closed position; and
at least one mold insert having a mold bottom and at least two sidewalls, the at least one mold insert being positioned at least partially in an interior of the forming tool lower part;
wherein the at least one mold insert has a first undercut defined in a first sidewall and a second undercut defined in a second sidewall for thermoforming said troughs in said packaging film, the first sidewall being in opposing relationship with the second sidewall, said troughs having undercut portions, wherein the at least one mold insert is movable relative to the forming tool lower part and orthogonally to the transport plane of the packaging film between a molding position and a removal position, wherein the at least one mold insert is at least moveable within said forming tool lower part from said molding position to said removal position when said forming tool upper part and said forming tool lower part are in said closed position, and wherein the at least one mold insert is formed as a single component.

2. The thermoform packaging machine according to claim 1, wherein in the forming tool lower part comprises a lift drive for raising and lowering the mold insert between said molding position and said removal position.

3. The thermoform packaging machine according to claim 2, wherein the lift drive is a common lift drive configured for raising and lowering a plurality of mold inserts disposed within said forming tool lower part.

4. The thermoform packaging machine according to claim 2, wherein the lift drive comprises one of a pneumatic cylinder and a servomotor.

5. The thermoform packaging machine according to claim 1, wherein the at least one mold insert has a clear height defined by a vertical height of the at least two sidewalls, and wherein the at least one mold insert is movable relative to the forming tool lower part by a distance of at least the clear height.

6. The thermoform packaging machine according to claim 1, wherein the undercuts have a depth defined by the sidewalls of at least 2 mm.

7. The thermoform packaging machine according to claim 1, further comprising at least a first clamp chain and a second clamp chain, said first clamp chain disposed to clamp a first side of said packaging film, and said second clamp chain disposed to clamp a second side of said packaging film, said first and second clamp chains being driven to convey said packaging film through at least said forming station.

8. A method of forming a film in a thermoform packaging machine, wherein the thermoform packaging machine comprises:
   a packaging film conveyed through the thermoform packaging machine in a transport plane;
   a forming station for forming troughs in the packaging film, said forming station having a forming tool upper part and a forming tool lower part, wherein the forming tool upper part and the forming tool lower part are disposed for relative movement between an open position and a closed position, wherein said forming tool upper part and said forming tool lower part clamp said packaging film in said closed position; and
   at least one mold insert having a mold bottom and at least two sidewalls, the at least one mold insert being positioned at least partially in an interior of the forming tool lower part;
   wherein the at least one mold insert has a first undercut defined in a first sidewall and a second undercut defined in a second sidewall for thermoforming said troughs in said packaging film, the first sidewall being in opposing relationship with the second sidewall, said troughs having undercut portions, wherein the at least one mold insert is movable relative to the forming tool lower part and orthogonally to the transport plane of the packaging film between a molding position and a removal position, wherein the at least one mold insert is at least moveable within said forming tool lower part from said molding position to said removal position when said forming tool upper part and said forming tool lower part are in said closed position, and wherein the at least one mold insert is formed as a single component, the method comprising the steps of:

closing the forming station and clamping the film between the forming tool upper part and the forming tool lower part;

moving the at least one mold insert within the forming tool lower part in a direction orthogonal to a transport plane of the film into said molding position;

thermoforming the film into the at least one mold insert accommodated in the interior of the forming tool lower part, so as to form troughs while bringing the film into contact with the undercuts defined in the mold insert, with the mold insert occupying a forming position;

moving the mold insert relative to the forming tool lower part and relative to the formed film from the molding position to a removal position while the film remains clamped between the forming tool upper part and the forming tool lower part; and opening the forming station after said thermoforming the film step.

9. The method according to claim 8, wherein the mold insert has a clear height equal to a vertical height of a mold insert sidewall, and wherein the mold insert is moved relative to the forming tool lower part a distance of at least the clear height during the moving step.

10. The method according to claim 8, wherein, by means of a common lift drive, a plurality of mold inserts is moved relative to the forming tool lower part between the forming position and the removal position during the moving step.

11. The method according to claim 8, wherein the film is clamped between at least one forming plate web of the forming tool lower part and the forming tool upper part while the mold insert is being moved relative to the forming tool lower part during the moving step.

12. The method according to claim 8, wherein the mold insert is prevented from moving to the forming position when the forming station is in a closed condition and a trough that has already been formed in the film is located between the forming tool upper part and the forming tool lower part.

* * * * *